United States Patent
Mathews, Jr. et al.

(10) Patent No.: US 6,713,732 B2
(45) Date of Patent: Mar. 30, 2004

(54) METHOD AND APPPARATUS FOR CONTROLLING TEMPERATURE

(75) Inventors: Harry Kirk Mathews, Jr., Clifton Park, NY (US); George Charles Goodman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 195 days.

(21) Appl. No.: 10/000,261

(22) Filed: Nov. 2, 2001

(65) Prior Publication Data

US 2003/0085220 A1 May 8, 2003

(51) Int. Cl.[7] .................................. H05B 1/02
(52) U.S. Cl. ....................... 219/497; 219/494
(58) Field of Search ................. 219/497, 501, 219/504, 505, 494, 492; 324/642, 646; 327/262, 276; 323/319

(56) References Cited

U.S. PATENT DOCUMENTS

| | | | | |
|---|---|---|---|---|
| 4,795,886 A | * | 1/1989 | Carter, Jr. | 219/505 |
| 4,980,586 A | * | 12/1990 | Sullivan et al. | 219/497 |
| 2003/0085221 A1 | * | 5/2003 | Smolenski et al. | 219/497 |

FOREIGN PATENT DOCUMENTS

| | | | | |
|---|---|---|---|---|
| DE | 3736659 C | * | 5/1989 | G05D/23/19 |
| JP | 2002-81793 A | * | 3/2002 | F25B/29/00 |

* cited by examiner

*Primary Examiner*—Tu Ba Hoang
(74) *Attorney, Agent, or Firm*—Jean K. Testa; Patrick K. Patnode

(57) ABSTRACT

An apparatus for controlling a temperature of a thermal load comprises: a dynamic compensator for calculating a heater command as a function of a user input signal without using a temperature measurement; and a heater for controlling temperature of the thermal load by applying heat in response to the said heater command.

34 Claims, 2 Drawing Sheets

METHOD AND APPPARATUS FOR CONTROLLING TEMPERATURE

CROSS REFERENCE TO RELATED APPLICATIONS

This application is related to commonly assigned Smolenski et al, "Apparatus For Cycle-Skipping Power Control," U.S. Application Number 10/000,275 which is filed concurrently herewith.

BACKGROUND

The present invention relates generally to the field of controlling temperature and more particularly to the improvement of temperature dynamic response using dynamic feedforward compensation.

A heater is used to manipulate a temperature of a thermal load in a wide variety of applications. Examples of heaters and respective thermal loads include, without limitation: space heaters for heating ambient air in living spaces; industrial ovens for heating materials in manufacturing processes; and cooking appliances for heating foods in meal preparation. Examples of cooking appliances include, without limitation, gas ranges, electric ranges and radiant electric cooktops.

In many such temperature control applications, a user provides an input command requesting a step change in heater output power and then waits for a corresponding temperature change to occur in the thermal load. The temperature change eventually achieved in steady state depends on the change in heater output power and on an equivalent thermal resistance of the thermal load. Evolution in time of the temperature change depends on one or more system time constants. Thermal system time constants arise, for example, as functions of thermal resistance distribution and thermal capacitance distribution within both the thermal load and the heater. Non-thermal system time constants arise, for example, as functions of any other energy storage mechanisms inherent in the heater and in any apparatus used for controlling the heater.

In some applications, the system time constants are large enough, compared to a desired response time, to warrant use of an automatic control system to attempt to quicken the command response. In a cooking application, for example, after a pan has been at a high temperature setting long enough to initiate boiling, it is desirable to set the temperature to a lower setting for simmering and have the temperature reduce quickly enough to avoid having the pan contents boil over.

Conversely, in some applications, the system time constants are small enough, compared to the desired response time, to warrant use of an automatic control system to attempt to slow the command response. In another cooking application, for example, after a pan has been at a low temperature it is desirable to set the temperature to a higher setting and have the temperature increase slowly enough to maintain an acceptably uniform temperature throughout the pan contents.

Approaches to automatic control system design, useful for either quickening or slowing the command response, divide into two classes: control systems which use temperature measurements (called "feedback designs", "closed loop designs", or "thermostats") and control systems which do not use temperature measurements (called "feedforward designs", "dynamic feedforward compensation" or "open loop designs").

When successful, feedback designs generally enjoy the advantages of being more accurate in response to temperature commands and of being less sensitive in response to external disturbances, such as, for example, ambient temperature and atmospheric pressure, than comparable feedforward designs. However, feedback designs generally suffer the disadvantages of being more expensive, owing to the cost of a temperature sensing device, and of being susceptible to instability in the face of unanticipated thermal load dynamics. Excessive sensitivity to thermal load dynamics results in an unsuccessful feedback design.

In temperature control applications where cost and the ability to accommodate a large assortment of thermal loads take precedence over accuracy and disturbance sensitivity, an opportunity exists for using an open loop design of a temperature controller to modify the temperature command response. For example, surface cooking is a temperature control application in which temperature is typically uncalibrated. Being uncalibrated, the success of a surface cooking application is critically dependent on low cost and the ability to operate properly with a wide range of cooking vessels (e.g., pots and pans) and cooking vessel contents (i.e., foods), while being indifferent to temperature accuracy and disturbance sensitivity.

SUMMARY

The opportunity described above for using an open loop design of a temperature controller to modify a temperature command response is addressed by the present invention. In one embodiment of the present invention, an apparatus for controlling a temperature of a thermal load comprises: a dynamic compensator for calculating a heater command as a function of a user input signal without using a temperature measurement; and a heater for controlling said temperature of said thermal load by applying heat in response to said heater command.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
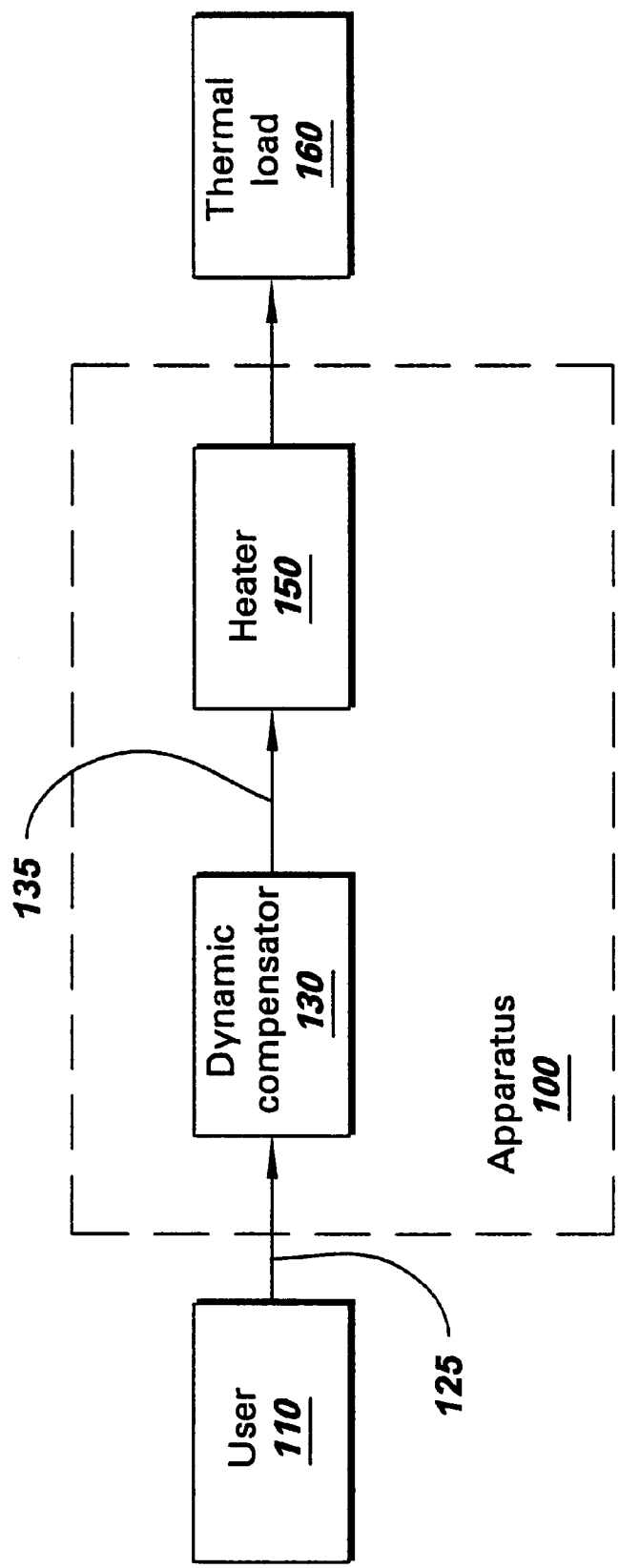
FIG. 1 is a block diagram illustrating an apparatus for controlling temperature in accordance with one embodiment of the present invention.

In accordance with one embodiment of the present invention, FIG. 1 is a block diagram illustrating an apparatus 100 for controlling a temperature of a thermal load 160, wherein the apparatus comprises a dynamic compensator 130 and a heater 150. A user 110 generates a user input signal 125 from which dynamic compensator 130 calculates, without using a temperature measurement, a heater command 135. In response to heater command 135, heater 150 applies heat so as to control the temperature of thermal load 160.

By virtue of not using a temperature measurement, dynamic compensator 130 is an example of a dynamic feedforward compensator or open loop design. Dynamic compensator 130 is realized in any one of a variety of means depending on the respective natures of user input signal 125 and heater command 135. By way of example, but not limitation, user input signal 125 and heater command 135 may comprise any combination of: mechanical signals such as, for example, shaft angles, torques, displacements, forces, and linkage positions; fluidic signals, such as, for example, pressures and flows of liquids and gases; or electrical signals, such as, for example, voltages and currents. Corresponding passive realizations of dynamic compensator 130 may comprise, for example, combinations of: masses, rotary inertias, and translational or rotational springs and dampers for compensating mechanical signals; volumes, accumulators, long piping runs, flow restrictors and porous plugs for compensating fluidic signals; and capacitors, inductors and resistors for compensating electrical signals. For electrical signals, examples of active realizations of dynamic compensator 130 include, without limitation: analog processors comprising, for example, operational amplifiers, transistors, analog computational modules and any combination thereof; and digital processors comprising, for example, small- , medium- , and large-scale integrated circuits (SSI, MSI, and LSI, respectively); microcomputers, microprocessors, single-chip digital signal processors (DSPs), application-specific integrated circuits (ASICs), and any combination thereof.

Heater 150 comprises any device capable of producing heat as a function of a command signal. In a more specific embodiment of the present invention in accordance with FIG. 1, heater 150 comprises a cooking appliance. In a still more specific embodiment of the present invention in accordance with FIG. 1, the cooking appliance comprises a member selected from the group consisting of electric ranges, electric cooktops, and combustion ranges. As used herein: a cooking appliance is any heater used in the preparation of food; an electric range is any cooking appliance wherein heat is produced by electrical resistance heating and transferred to a cooking vessel by thermal conduction; an electric cooktop is any cooking appliance wherein heat is produced by electrical resistance heating and transferred to a cooking vessel by thermal radiation; and a combustion range is any cooking appliance wherein heat is produced by combustion of one or more fuels.

Figure 2:
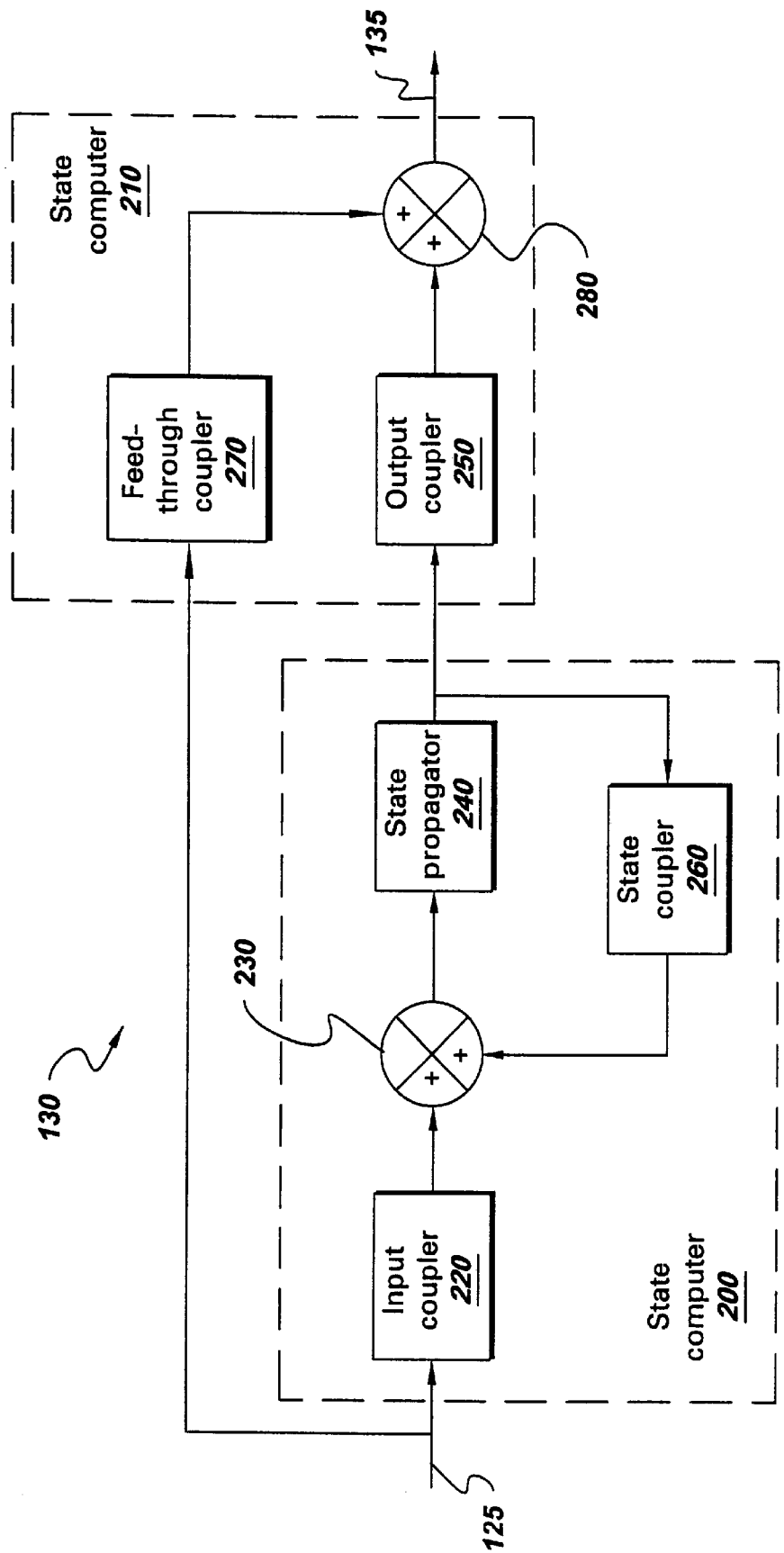
FIG. 2 is a block diagram illustrating a more detailed embodiment of the present invention in accordance with the embodiment of FIG. 1.

In accordance with the embodiment of FIG. 1, FIG. 2 is a block diagram illustrating a more detailed embodiment of the present invention wherein dynamic compensator 130 comprises a state computer 200 and an output computer 210. State computer 200 computes a (meaning at least one) state variable from user input signal 125 and from previously computed values of the state variable. Using the previously computed values of the state variable to compute a present value of the state variable gives rise to a dynamic (i.e., varying in time) behavior of dynamic compensator 130. From the state variable and user input signal 125, output computer 210 computes heater command 135. In contrast to the dynamic computation performed by state computer 200, the computation performed by output computer 210 is typically a static mapping.

In a more specific embodiment of the present invention in accordance with FIG. 2, state computer 200 comprises an input coupler 220, a state coupler 260, a state summer 230, and a state propagator 240. Input coupler 220 computes an input propagation value from user input signal 125 while state coupler 260 computes a state propagation value from the previously computed values of the state variable. State summer 230 adds the input propagation value to the state propagation value to produce a total propagation value from which state propagator 240 updates the state variable.

The embodiment of the present invention in accordance with FIG. 2 is equally applicable to continuous-time and discrete-time implementations of dynamic compensator 130 with the implementations differing only as to the nature of state propagator 240.

In a continuous-time embodiment of the present invention in accordance with FIG. 2, state propagator 240 comprises an (meaning at least one) integrator corresponding to the state variable. Thus, the total propagation value comprises a time derivative of the state variable and the total propagation value is integrated in time by the integrator to yield the state variable itself.

In a discrete-time embodiment of the present invention in accordance with FIG. 2, state propagator 240 comprises a (meaning at least one) delay element corresponding to the state variable. Thus, the total propagation value comprises the next value of the state variable, and the total propagation value is delayed by one sample time to yield the present value of the state variable.

In another more specific embodiment of the present invention in accordance with FIG. 2, output computer 210 comprises a feedthrough coupler 270, an output coupler 250, and an output summer 280. Feedthrough coupler 270 computes an input contribution value from user input signal 125 while output coupler 250 computes a state contribution value from the state variable. Output summer 280 adds the input contribution value to the state contribution value to yield heater command 135.

In typical embodiments, input coupler 220, state coupler 260, output coupler 250, and feedthrough coupler 270 comprise matrix multipliers respectively comprising an input coupling matrix, a state coupling matrix, an output coupling matrix, and a feedthrough matrix. Whereas user input signal 125 and heater command 135 are typically scalar valued signals, the state variable is typically a vector valued signal. If the dimension of the state variable vector valued signal is N, then the input coupling matrix is dimensioned N×1, the state coupling matrix is dimensioned N×N, the output coupling matrix is dimensioned 1×N, and the feedthrough matrix is dimensioned 1×1, where a matrix is said to be "dimensioned R×C" if it has R rows and C columns.

In the generic case where user input signal 125 is a vector valued signal of dimension P and heater command 135 is a vector valued signal of dimension Q, then the input coupling matrix is dimensioned N×P, the output coupling matrix is dimensioned Q×N, and the feedthrough matrix is dimensioned Q×P. It will be obvious to one of ordinary skill in the art that alternative arrangements of matrix multipliers produced by algebraic manipulation (i.e., block diagram manipulation) of dynamic compensator 130 are equivalents of dynamic compensator 130.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for controlling a temperature of a thermal load, said apparatus comprising:
   a dynamic compensator for calculating a heater command as a function of a user input signal, wherein the heater command comprises mechanical signals or electrical signals and wherein the heater command is independent of a temperature measurement; and a heater for controlling said temperature of said thermal load by applying heat in response to said heater command; wherein the apparatus is an open boo apparatus.

2. The apparatus of claim 1 wherein said dynamic compensator comprises:
- a state computer for computing a state variable from said user input signal and from previously computed values of said state variable; and
- an output computer for computing said heater command from said state variable and said user input signal.

3. The apparatus of claim 2 wherein said state computer comprises:
- an input coupler for computing an input propagation value from said user input signal;
- a state coupler for computing a state propagation value from said previously computed values of said state variable;
- a state summer for adding said input propagation value to said state propagation value to produce a total propagation value; and
- a state propagator for calculating said state variable from said total propagation value.

4. The apparatus of claim 3, wherein the state computer is a continuous time state computer, and wherein said state propagator integrates said total propagation value to generate the state variable.

5. The apparatus of claim 3 wherein the state computer is a discrete time state computer, and wherein said state propagator delays said total propagation value to generate the state variable.

6. The apparatus of claim 2 wherein said output computer comprises:
- a feedthrough coupler for computing an input contribution value from said user input signal;
- an output coupler for computing a state contribution value from said state variable; and
- an output summer for adding said input contribution value to said state contribution value to yield said heater command.

7. The apparatus of claim 1 wherein said heater comprises a cooking appliance.

8. The apparatus of claim 7 wherein said cooking appliance comprises a member selected from the group consisting of electric ranges, electric cooktops, and combustion ranges.

9. An apparatus for controlling a temperature of a cooking vessel, said apparatus comprising;
- a dynamic compensator for calculating a heater command as a function of a user input signal, wherein the heater command comprises mechanical signals or electrical signals and wherein the heater command is independent of a temperature measurement; and
- a cooking appliance for applying heat so as to control said temperature of said cooking vessel in response to said heater command, wherein the apparatus is an open loop apparatus.

10. The apparatus of claim 9 wherein said dynamic compensator comprises:
- a state computer for computing a state variable from said user input signal and from previously computed values of said state variable; and
- an output computer for computing said heater command from said state variable and said user input signal.

11. The apparatus of claim 10 wherein said state computer comprises:
- an input coupler for computing an input propagation value from said user input signal;
- a state coupler for computing a state propagation value from said previously computed values of said state variable;
- a state summer for adding said input propagation value to said state propagation value to produce a total propagation value; and
- a state propagator for calculating said state variable from said total propagation value.

12. The apparatus of claim 11 wherein the state computer is a continuous time state computer, and wherein said state propagator integrates said total propagation value to generate the state variable.

13. The apparatus of claim 11, wherein the state computer is a discrete time state computer, and wherein said state propagator integrates said total propagation value to generate the state variable.

14. The apparatus of claim 10 wherein said output computer comprises:
- a feedthrough coupler for computing an input contribution value from said user input signal;
- an output coupler for computing a state contribution value from said state variable; and
- an output summer for adding said input contribution value to said state contribution value to yield said heater command.

15. The apparatus of claim 9 wherein said cooking appliance comprises a member selected from the group consisting of electric ranges, electric cooktops, and combustion ranges.

16. A method for controlling a temperature of a thermal load, said method comprising:
- dynamically calculating a heater command as a function of a user input signal, wherein the heater command comprises mechanical signals or electrical signals and wherein the heater command is independent of a temperature measurement; and
- controlling said temperature of said thermal load by applying said heater command to a heater, wherein the method is an open loop method.

17. The method of claim 16 wherein dynamically calculating said heater command comprises:
- computing a state variable from said user input signal and from previously computed values of said state variable; and
- computing said heater command 1 mm said state variable and said user input signal.

18. The method of claim 17 wherein computing said state variable comprises:
- computing an input propagation value from said user input signal;
- computing a state propagation value from said previously computed values of said state variable;
- adding said input propagation value to said state propagation value to produce a total propagation value; and
- calculating said state variable from said total propagation value.

19. The method of claim 16 wherein calculating said state variable from said total propagation value comprises integrating said total propagation value.

20. The method of claim 18 wherein calculating said state variable from said total propagation value comprises delaying said total propagation value.

21. The method of claim 17 wherein computing said heater command comprises:
- computing an input contribution value f mm said user input signal;

computing a state contribution value from said state variable; and adding said in put contribution value to said state contribution value to yield said heater command.

22. The method of claim 16 wherein said heater comprises a cooking appliance.

23. The method of claim 22 wherein said cooking appliance comprises a member selected from the group consisting of electric ranges, electric cooktops, and combustion ranges.

24. A method for controlling a temperature of a cooking vessel, said method comprising:

dynamically calculating a heater command as a function of a user input signal, wherein the heater command comprises mechanical signals or electrical signals and wherein the heater command is independent of a temperature measurement; and controlling said temperature of said cooking vessel by applying said heater command to a cooking appliance, wherein the method is an open loop method.

25. The method of claim 24 wherein dynamically calculating said heater command comprises:

computing & state variable from said user input signal and from previously computed values of said state variable; and computing said heater command from said state variable and said user input signal.

26. The method of claim 25 wherein computing said state variable comprises:

computing an input propagation value from said user input signal;

computing a state propagation value from said previously computed values of said state variable;

adding said input propagation value to said state propagation value to produce a total propagation value; and calculating said state variable from said total propagation value.

27. The method of claim 26 wherein calculating said state variable from said total propagation value comprises integrating said total propagation value.

28. The method of claim 26 wherein calculating said state variable from said total propagation value comprises delaying said total propagation value.

29. The method of claim 25 wherein computing said heater command comprises:

computing an input contribution value from said user input signal;

computing a state contribution value from said state variable; and adding said input contribution value to said state contribution value to yield said heater command.

30. The method of claim 24 wherein said cooking appliance comprises a member selected from the group consisting of electric ranges, electric cooktops, and combustion ranges.

31. The apparatus of claim 1, wherein the mechanical signals comprises shaft angles, torques, displacements, forces, linkage positions, and fluidic signals.

32. The apparatus of claim 1, wherein the electrical signals comprises voltages and currents.

33. The method of claim 16, wherein the mechanical signals comprises shaft angles, torques, displacements, forces, linkage positions, and fluidic signals.

34. The method of claim 16, wherein the electrical signals comprises voltages and currents.

* * * * *

UNITED STATES PATENT AND TRADEMARK OFFICE
CERTIFICATE OF CORRECTION

PATENT NO.    : 6,713,732 B2
DATED         : March 30, 2004
INVENTOR(S)   : Harry Kirk Matthews, Jr. and George Charles Goodman It is certified that error appears in the above-identified patent and that said Letters Patent is hereby corrected as shown below:

Column 4,
Line 61, claim 1 should be corrected to read as follows:
1. An apparatus for controlling a temperature of a thermal load, said apparatus comprising:
a dynamic compensator for calculating a heater command as a function of a user imput signal,
  wherein the heater command comprises mechanical signals or electrical signals and
  wherein the heater command is independent of a temperature measurement; and
a heater for controlling said temperature of said thermal load by applying heat in response to said heater command; wherein the apparatus is an open loop apparatus.

Column 7,
Line 21, claim 25 should be corrected to read as follows:
25. The method of claim 24 wherein dynamically calculating said heater command comprises:
computing a state variable from said user input signal and from previously computed values of said state variable; and
computing said heater command from said state variable and said user imput signal.

Signed and Sealed this

Nineteenth Day of October, 2004

JON W. DUDAS
*Director of the United States Patent and Trademark Office*